US011859775B2

(12) United States Patent
Van Bommel et al.

(10) Patent No.: US 11,859,775 B2
(45) Date of Patent: Jan. 2, 2024

(54) LIGHT-EMITTING DIODE FILAMENT ARRANGEMENT COMPRISING AT LEAST ONE BENDING UNIT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/761,560

(22) PCT Filed: Sep. 17, 2020

(86) PCT No.: PCT/EP2020/075999
§ 371 (c)(1),
(2) Date: Mar. 17, 2022

(87) PCT Pub. No.: WO2021/053080
PCT Pub. Date: Mar. 25, 2021

(65) Prior Publication Data

US 2022/0221112 A1 Jul. 14, 2022

(30) Foreign Application Priority Data

Sep. 19, 2019 (EP) .................................... 19198371

(51) Int. Cl.

| | |
|---|---|
| ***F21K 9/232*** | (2016.01) |
| *F21Y 115/10* | (2016.01) |
| *F21Y 107/70* | (2016.01) |

(52) U.S. Cl.
CPC .......... *F21K 9/232* (2016.08); *F21Y 2107/70* (2016.08); *F21Y 2115/10* (2016.08)

(58) Field of Classification Search
CPC ... F21K 9/232; F21Y 2107/70; F21Y 2115/10
See application file for complete search history.

(56) References Cited

U.S. PATENT DOCUMENTS

| | | | |
|---|---|---|---|
| 2015/0069442 A1 | 3/2015 | Liu et al. | |
| 2018/0119892 A1 | 5/2018 | Jiang et al. | |
| 2019/0203921 A1* | 7/2019 | He ....................... | F21V 29/508 |

(Continued)

FOREIGN PATENT DOCUMENTS

| | | |
|---|---|---|
| CN | 105371243 A | 3/2016 |
| CN | 205480835 U | 8/2016 |
| CN | 106764522 A | 5/2017 |

(Continued)

OTHER PUBLICATIONS

Wang et al., CN_205480835_U_I, machine translation Aug. 2016 (Year: 2016).*

*Primary Examiner* — Tracie Y Green

(57) ABSTRACT

The present disclosure relates to a light emitting diode (LED) filament arrangement (100) which comprises an elongated, flexible LED filament (110) having a plurality of LEDs arranged along the elongation of the filament. The arrangement further comprises a bending unit (120) having a body in which a channel (121) is formed. A portion of the LED filament is arranged within the channel of the bending unit, and the bending unit is at least partially curved and adapted to induce a bend in the LED filament.

16 Claims, 6 Drawing Sheets

(56) References Cited

U.S. PATENT DOCUMENTS

2022/0341570 A1* 10/2022 Van Bommel ........ F21V 19/002

FOREIGN PATENT DOCUMENTS

| | | | |
|---|---|---|---|
| CN | 208579174 | U | 3/2019 |
| EP | 2778503 | A2 | 9/2014 |
| KR | 2018000816 | A | 1/2018 |
| WO | 2019015763 | A1 | 1/2019 |

* cited by examiner

LIGHT-EMITTING DIODE FILAMENT ARRANGEMENT COMPRISING AT LEAST ONE BENDING UNIT

CROSS-REFERENCE TO PRIOR APPLICATIONS

This application is the U.S. National Phase application under 35 U.S.C. § 371 of International Application No. PCT/EP2020/075999, filed on Sep. 19, 2019, which claims the benefit of European Patent Application No. 19198371.7, filed on Sep. 19, 2019. These applications are hereby incorporated by reference herein.

TECHNICAL FIELD

The present disclosure relates generally to the field of solid state lighting. Specifically, it relates to light emitting diode (LED) filament arrangements comprising bending units for inducing bends in a LED filament.

BACKGROUND

Incandescent lamps are rapidly being replaced by light emitting diode (LED) based lighting solutions. The look and aesthetic provided by incandescent bulbs is nevertheless still appreciated by consumers who also value the opportunity of using retrofit LED lamps in existing luminaires. A goal for developers of LED-based lighting is thus to provide decorative retrofit LED lamps providing an aesthetically pleasing appearance and illumination.

In order to provide sufficient illumination from a LED lamp, several short LED filaments may be used. However, as each LED filament needs to be individually electrically connected, the production may be complicated.

Another option is to use longer, flexible filaments which may be bent to produce various configurations. Such solutions, on the other hand, may present irregular behavior as LED filament portions which are bent or under stress may be susceptible for reliability issues.

SUMMARY

It is therefore an object of the present invention to overcome at least some of the above mentioned drawbacks. This and other objects are achieved by means of a LED filament arrangement as defined in the appended independent claim. Other embodiments are defined by the dependent claims.

According to an aspect of the present disclosure, a light emitting diode, LED, filament arrangement is provided. The LED filament arrangement comprises an elongated, flexible LED filament having a plurality of LEDs arranged along the elongation (i.e. along a direction of elongation) of the LED filament. The arrangement further comprises a bending unit having a body in which an at least partially curved channel is formed. A portion of the LED filament is arranged within the channel of the bending unit. The bending unit is adapted to induce a bend in the LED filament.

It will be appreciated that further portions of the LED filament are not arranged within a bending unit. Providing a bending unit for inducing a bend in a LED filament may increase the reliability of the LED filament arrangement. For example, a LED filament arrangement employing a bending unit for inducing a bend in a LED filament may better retain its initial (intended) shape. Further, the bending unit may hold the LED filament in its bent form, such that it is not straightened or bent too much. In a LED filament which is bent too much, or is bent and straightened too many times, electrical connections between LEDs may for example be damaged. Further, many LED filaments comprise a substrate, on which the LEDs are arranged, and an encapsulant covering the LEDs and at least a side of the substrate. Bending such a LED filament too much, or bending and straightening it too many times, may lead to the encapsulant of the LED filament peeling off the substrate and/or LEDs, which may result in a less uniform light-distribution. It will be appreciated that the bending unit may be pre-formed to induce a desired bend/orientation to the flexible LED filament. As such, a desired decorative appearance may be obtained. Further, the light distribution may be enhanced, as a more optimal arrangement and orientation of the LED filament may be obtained and maintained. The bending unit may have a length in the range 5-50 mm. Specifically, the bending unit may have a length in the range 8-30 mm. More specifically, the bending unit may have a length in the range 10-20 mm.

Alternatively, the length of the bending unit may be defined relative to the length of the LED filament. For example, the length of the bending unit may be 0.05 to 0.3 times the length of the LED filament. Specifically, the length of the bending unit may be 0.08 to 0.25 times the length of the LED filament. More specifically, the length of the bending unit may be in the range 0.1 to 0.2 times the length of the LED filament.

The bending unit may further have an inner diameter, i.e. a diameter of the channel. For example, the bending unit may have an inner diameter (i.e. a diameter of the channel) in the range 1-10 mm. Specifically, the bending unit may have an inner diameter in the range 2-7 mm. More specifically, the bending units may have an inner diameter in the range 3-5 mm.

Alternatively, the inner diameter of the bending unit may be defined relative to the diameter of the LED filament. For example, the inner diameter of the bending unit may be 0.8 to 1.5 times the diameter of the LED filament. Specifically, the inner diameter of the bending unit may be 0.9 to 1.3 times the diameter of the LED filament. More specifically, the inner diameter of the bending unit may be 1 to 1.2 times the diameter of the LED filament.

According to some embodiments, the bending unit may be at least partially light-transmissive.

For example, the body of the bending unit may be translucent or transparent. Such embodiments may provide improved light distribution (or increased illumination) as light emitted by the portion of the LED filament which is arranged within the channel is not blocked.

Such at least partially light-transmissive bending units may comprise a material such as glass or a polymer.

According to some embodiments, the bending unit may be at least partially light-blocking.

Arrangements comprising such bending units may give the illusion or appearance of multiple, shorter LED filaments being employed.

At least partially light-blocking bending units may comprise a material such as copper or aluminum.

According to some embodiments, the bending unit may comprise a material with a thermal conductivity which is higher than, or equal to, 200 $Wm^{-1}K^{-1}$.

Such embodiments may provide improved thermal management. For instance, transfer of heat generated by the portion of the LED filament arranged within the channel may be improved such that the LED filament remains at an adequate temperature.

Specifically, the body may comprise a material having a thermal conductivity of at least 250 $Wm^{-1}K^{-1}$. More specifically, the body may comprise a material having a thermal conductivity of at least 350 $Wm^{-1}K^{-1}$. For example, the body may comprise a high thermal conductive material such as aluminum, iron, steel or copper.

According to some embodiments, the bending unit may comprise a slit, extending through the body along an elongation of the channel. The slit may be adapted for insertion of the LED filament into the channel.

The slit may extend along the entire channel. The slit may further act as an opening for insertion of the LED filament into the channel. Such a slit may allow for the LED filament to be inserted sideways into the channel. Thus, the entire LED filament up until the desired portion may not need to be fed through the channel. Further, as a LED filament may be arranged within the bending unit without a larger portion being fed through the channel, the LED filament may not be unnecessarily bent.

For example, the width of the slit may be larger than the diameter of the LED filament, but smaller than the inner diameter or width of the channel. Alternatively, the width of the slit may be slightly smaller than the diameter of the LED filament. In such embodiments, the LED filament may be inserted into the channel if the LED filament has a certain flexibility (for example, comprising a flexible encapsulant). The LED filament may thus be fixed in bending unit.

The body of the bending unit may comprise a surface which defines a wall of the channel. The shape of the wall may be adapted to the circumference of a type of LED filament, such that LED filaments of the type may fit in the channel.

According to some embodiments, the surface defining a wall of the channel may comprise at least one recess. For example, the surface of the wall may comprise at least two recesses. Specifically, the surface may comprise at least three recesses. Such embodiments may provide improved thermal management. Specifically, the recess may allow an air flow within the bending unit, which may carry off heat from the LED filament.

According to some embodiments, the at least one recess may extend along an elongation of the channel. For example, the at least one recess may extend along the entire length of the channel. Such embodiments may provide further improved thermal management.

According to some embodiments, the surface of the body defining a wall of the channel may have a reflectivity of at least 85%.

Specifically, the surface/wall may have a reflectivity of at least 90%. More specifically, the surface/wall may have a reflectivity of at least 92%.

A high reflectivity may allow for light to be reflected and be emitted at the ends of the bending unit. Less heat may be generated if the light is reflected instead of being absorbed by the bending units.

According to some embodiments, the surface defining a wall of the channel may be coated with a coating layer comprising a metal. For example, the coating layer may comprise silver or aluminum. A metal coating may improve the reflectivity of the surface. A metal coating may also improve the thermal conductivity of the surface.

For example, the metal layer may be applied using a deposition technique, such as for example physical vapor deposition or chemical vapor deposition.

According to some embodiments, the surface defining a wall of the channel may be coated with a coating layer comprising a polymer and light-scattering particles. For example, the polymer may be silicone. Light-scattering particles may e.g. comprise barium sulfate ($BaSO_4$), aluminum(III) oxide ($Al_2O_3$), or titanium dioxide ($TiO_2$). A polymer coating with light-scattering particles may improve the light distribution of the bending unit. Such a coating layer may further increase the reflectivity of the surface.

For example, the coating layer may comprise a matrix material, such as a polymer matrix comprising particles. Such particles may comprise silver-based particles, aluminum-based particles, or light-scattering particles as described above.

According to some embodiments, the portion of the LED filament which is arranged within the channel may comprise more than one LED.

For example, the portion of the LED filament which is arranged within the channel may comprise more than three LEDs. Specifically, the portion of the LED filament which is arranged within the channel may comprise more than five LEDs. More specifically, the portion of the LED filament which is arranged within the channel may comprise more than seven LEDs.

According to some embodiments, the arrangement may comprise a plurality of bending units. Each bending unit may be adapted to induce a bend in the LED filament.

For example, the plurality of bending units may comprise at least three bending units. Specifically, the plurality of bending units may comprise at least five bending units. More specifically, the plurality of bending units may comprise at least seven bending units.

Specifically, each bending unit may be adapted to induce a bend in a separate portion of the LED filament. Using a plurality of bending units, multiple bends may be induced in a single LED filament. Further, using a plurality of bending units, a number of bends, which would otherwise (i.e. without bending units) be impossible without reliability issues, may be induced in a single LED filament.

Using a plurality of bending units, the LED filament may, for example, be arranged in a crown shape, a zig-zag shape, or a spiral shape. It will be appreciated that many other shapes and arrangements may be possible with the use of bending units.

According to some embodiments, the at least partial curvature of the channel may be rounded such that the channel has a U-shape.

A rounded curvature of the channel may prevent sharp bends in the LED filament. As sharp bends may induce strain in some LED filaments, the reliability of the LED filament arrangement may be improved.

Further, the bending unit may form more than one bend. For example, the bending unit may have a meander-shape. The bending unit may further have a spiral shape, forming one or more loops.

According to some embodiments, the bending unit may have a tubular shape. In other words, the bending unit may have a rounded and hollow shape.

According to some embodiments, a lighting device may be provided. The lighting device may comprise a LED filament arrangement as described above with reference to any of the preceding embodiments. The lighting device may further comprise an at least partially light-transmissive envelope which may at least partly envelop the LED filament arrangement. The lighting device may further comprise a base on which the envelope may be mounted. The base may be adapted to be connected to a luminaire socket. A lighting device may for example be a lamp or a bulb.

It is noted that other embodiments using all possible combinations of features recited in the above described embodiments may be envisaged. Thus, the present disclosure also relates to all possible combinations of features mentioned herein.

BRIEF DESCRIPTION OF DRAWINGS

Exemplifying embodiments will now be described in more detail with reference to the following appended drawings:

FIGS. 3*a* and 3*b* show illustrations of a bending unit, in accordance with some embodiments, wherein FIG. 3*a* is an isometric view of the bending unit, and FIG. 3*b* is a cross section taken along the line A-A';

FIGS. 4*a* and 4*b* show illustrations of a LED filament arrangement, in accordance with some embodiments; wherein FIG. 4*a* is an isometric view of the LED filament arrangement, and FIG. 4*b* is a cross section taken along the line B-B';

FIGS. 6*a* and 6*b* show illustrations of a LED filament arrangement, in accordance with some embodiments; wherein FIG. 6*a* is an isometric view of the LED filament arrangement, and FIG. 6*b* is a cross section taken along the line C-C';

As illustrated in the figures, the sizes of elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
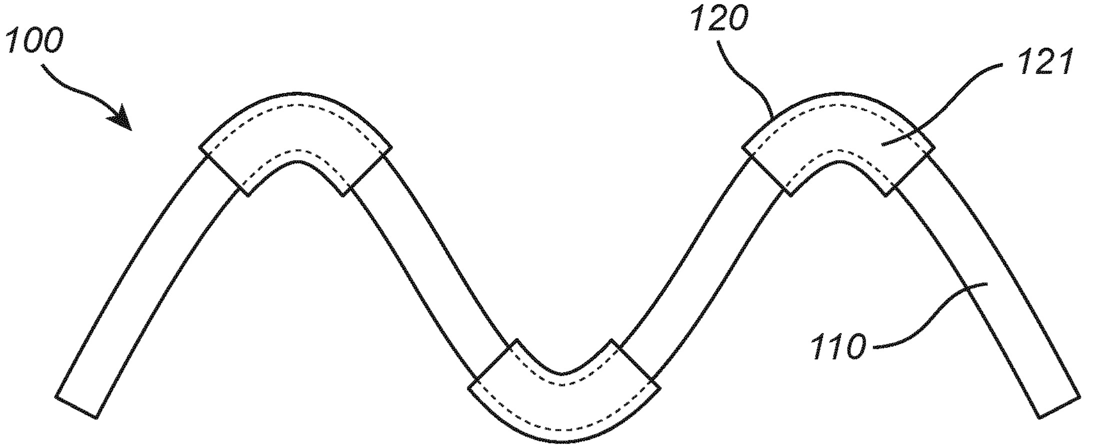
FIG. 1 is a schematic view of a LED filament arrangement, in accordance with some embodiments.

With reference to FIG. 1, a LED filament arrangement 100, in accordance with some embodiments, will be described. The LED filament arrangement 100 comprises an elongated, flexible LED filament 110. The LED filament arrangement 100 further comprises three bending units 120. Each bending unit comprises a body, in which a channel 121 is defined or formed. Within the channel of each bending unit, a portion of the LED filament 110 is arranged. The channels 121 of the bending units 120 are curved, such that bends are induced in the LED filament 110. In the specific embodiment shown in FIG. 1, the bending units 120 are arranged such that the LED filament 110 forms a zig-zag shape (i.e. a shape having abrupt alternate left and right turns, or up and down turns or the like). In the present embodiment, portions of the LED filament 110 which are outside, and between, the bending units 120 are substantially straight.

Further, in the present embodiment, the bending units 120 are at least partially light-transmissive. Specifically, the bending units 120 are transparent, meaning that the portions of the LED filament 110 which are arranged within (inside) the channels 121 of the bending units 120 are visible through the bending units 120. As the bending units 120 are transparent, light emitted by the portions of the LED filament 110 which are arranged within the bending units 120 may be emitted through the bending units 120.

Figure 2:
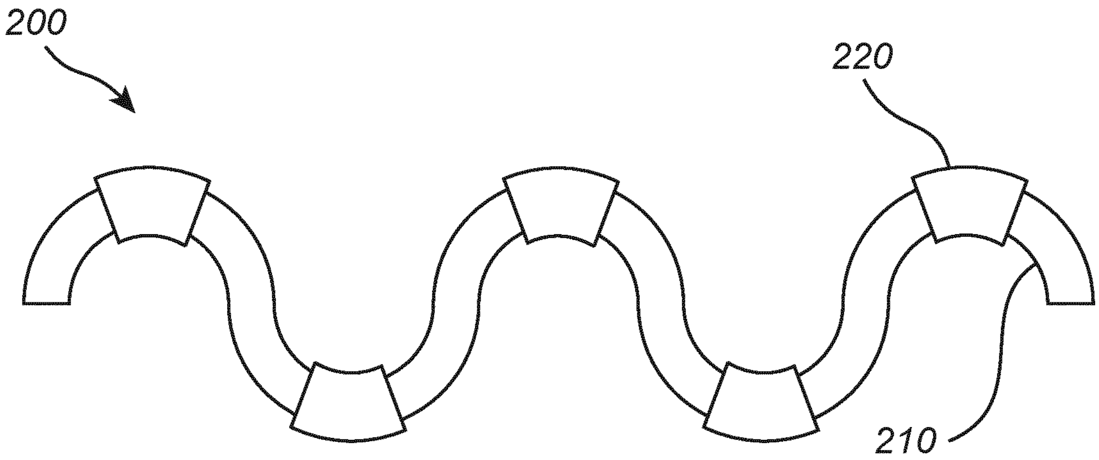
FIG. 2 is a schematic view of a LED filament arrangement, in accordance with some embodiments.

With reference to FIG. 2, a LED filament arrangement 200, in accordance with some embodiments, will be described.

The LED filament arrangement 200 illustrated in FIG. 2 comprises a LED filament 210, which may be equivalent to the LED filament 110 as described with reference to FIG. 1. The LED filament arrangement 200 further comprises five bending units 220. As described above with reference to FIG. 1, the bending units each comprise a channel in which a portion of the LED filament 220 is arranged. However, as the bending units 220 of the present embodiment are light-blocking, these channels are not visible in FIG. 2. Further, the curvature of the channels and the arrangement of the bending units induce an S-like curvature of the LED filament 210, with a bending unit 220 arranged at the outmost point of each turn of the S-curve.

Figure 3A:
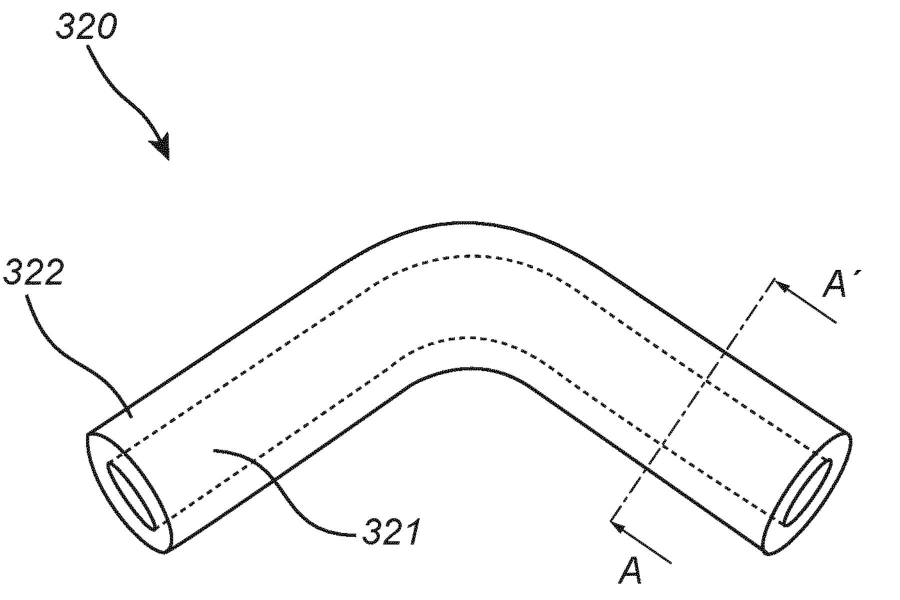
Figure 3B:
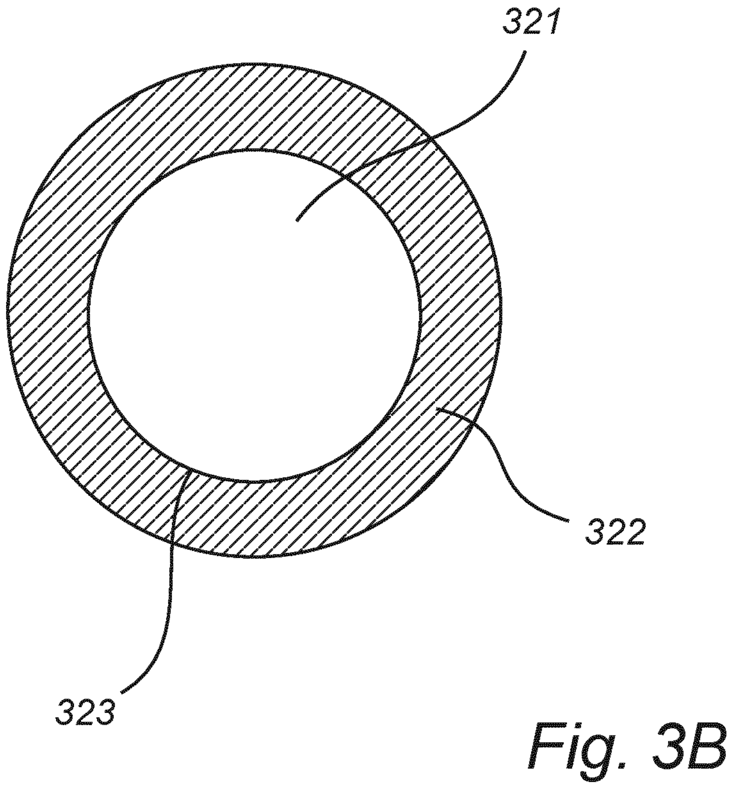

With reference to FIGS. 3*a* and 3*b*, a bending unit 320, in accordance with some embodiments, will be described. FIG. 3*a* is an isometric view of the bending unit 320. FIG. 3*b* is a cross-sectional view of the bending unit 320 taken along the line A-A', which is normal to the local extension of the channel.

The bending unit 320 comprises a body 322, in which a channel 321 is formed. In the present embodiment, the body 322 is light-transmissive. It will be appreciated that, in other embodiments, the body may be at least partially light-blocking. Further, the bending unit 320 (specifically the body 322) may comprise a material with a thermal conductivity of at least 200 $Wm^{-1}K^{-1}$. For example, the bending unit 320 may comprise any high thermal conductive materials such as aluminum, iron, steel or copper.

The bending unit 320 has a surface 323 which defines a wall of the channel 321. The surface 323 may be highly reflective, for example it may have a reflectivity of at least 85%. The surface 323 may have an even higher reflectivity, for example the reflectivity may be 90%, 92% or higher.

The surface 323 may further comprise a coating layer. The coating layer may comprise a metal, such as silver or aluminum. The coating layer may also comprise a polymer, such as silicone, and light scattering particles, such as barium sulfate ($BaSO_4$), aluminum(III) oxide ($Al_2O_3$), or titanium dioxide ($TiO_2$).

The bending unit 320 of the present embodiment has a bent/curved tubular shape. As may be seen in FIG. 3*b*, the cross section of the bending unit 320 has a substantially circular outer perimeter. Further, the surface 323 defining the wall of the channel is also substantially circular, in the cross-sectional view. It is appreciated that the channel and the body of the bending unit may have differently shaped cross sections in other embodiments. Specifically, the channel may be shaped to accommodate a type of LED filament with which it is intended to be used.

Figure 4A:
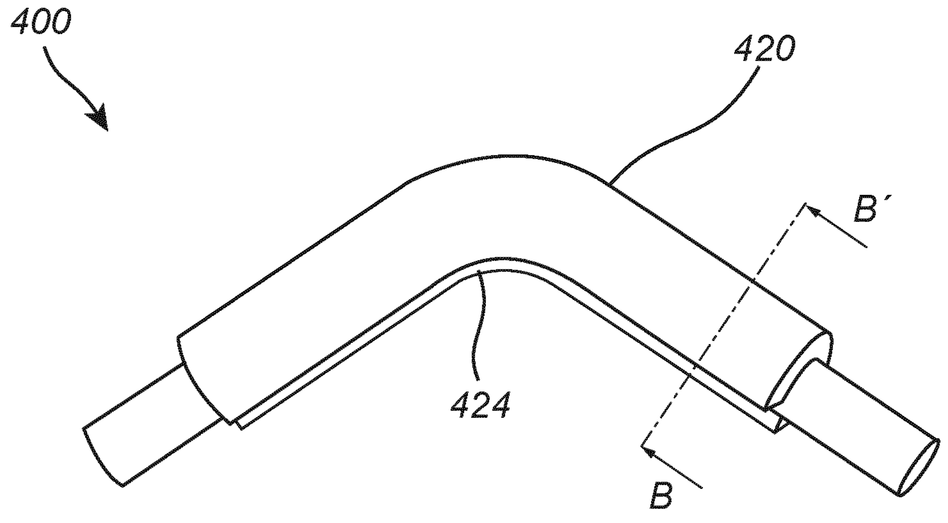
Figure 4B:
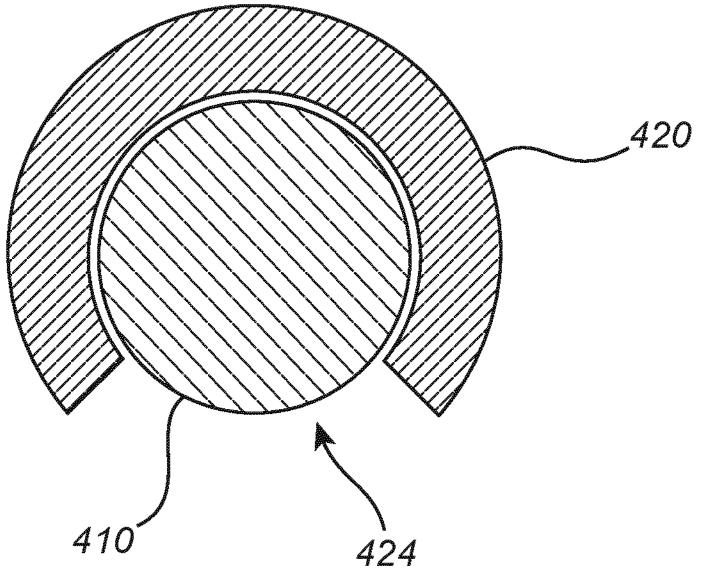

With reference to FIGS. 4*a* and 4*b*, a LED filament arrangement 400, in accordance with some embodiments, will be described. FIG. 4*a* is an isometric view of the LED filament arrangement 400. FIG. 4*b* is a cross-sectional view taken along the line B-B' which is normal to the local extension of the bending unit 420 and the LED filament 410.

The LED filament 410 may be equivalent to any of the LED filaments described with reference to the preceding figures. The bending unit 420 may be equivalent to any of the previously mentioned bending units described with reference to FIGS. 1-3, except that it comprises a slit 424. The slit 424 provides an opening between the outside of the bending unit 420 and the channel, extending along the elongation of the bending unit 420. The slit 424 is adapted to allow for insertion of the LED filament 410 into the channel. Specifically, in the present embodiment, the slit 424 is adapted to allow for sideways insertion of the LED filament 410 into the channel. To insert the LED filament 410 sideways into the channel, the LED filament 410 may be aligned parallel with the slit 424. (Light) force may be applied to either the LED filament or the bending unit (or both) to press them together, and thus insert the LED filament 410 into the slit 424. The bending unit 420 may thus have a certain flexibility/elasticity, which may allow the bending unit 420 to be slightly deformed during the insertion, and then return back to its original shape.

In other embodiments, the LED filament may be thread into the channel of the bending unit by inserting one end of the LED filament into one end of the channel and threading it through the channel until the portion in which the bend is to be induced is within the channel.

Figure 5:
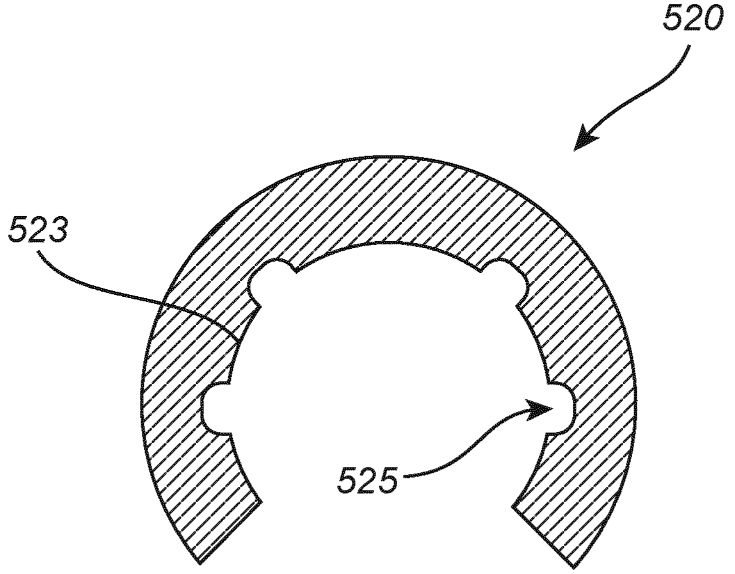
FIG. 5 is a schematic view of a cross section of a bending unit, in accordance with some embodiments.

With reference to FIG. 5, a bending unit 520, in accordance with some embodiments, will be described. FIG. 5 is a cross-sectional view of a bending unit, similar to those shown in FIGS. 3*b* and 4*b*. The bending unit 520 may be equivalent to the bending unit 420 described with reference to FIG. 4, except that the surface 523 defining a wall of the channel comprises a plurality of recesses 525. The recesses 525 may extend along the entire length of the channel. Alternatively, the recesses 525 may only extend along some portions of the channel.

It will be appreciated that bending units without a slit, such as those depicted in for example FIGS. 1, 2, 3*a* and 3*b*, may comprise recesses as described herein with reference to FIG. 5. Further, different embodiments may comprise fewer or more recesses along the inner surface 523 (i.e. the surface defining the wall of the channel).

Figure 6A:
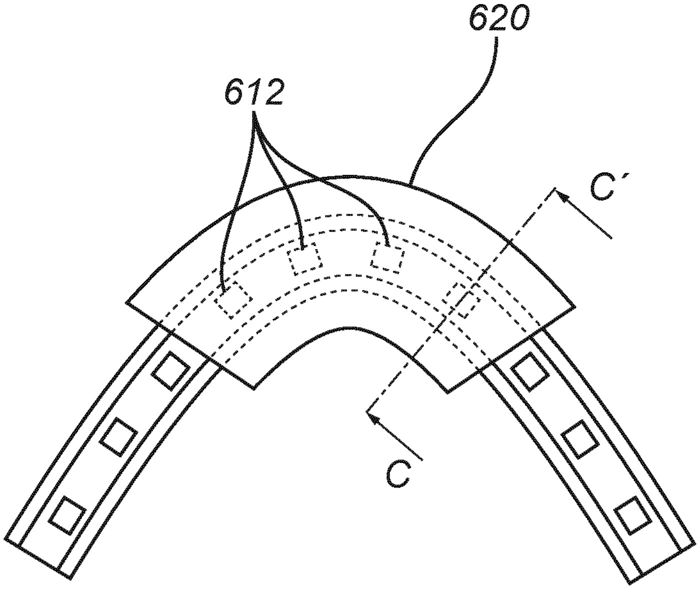
Figure 6B:
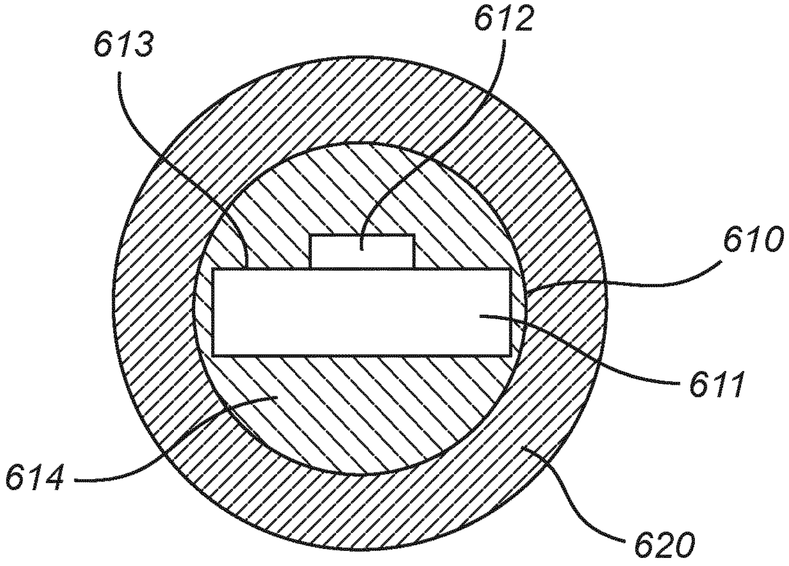

With reference to FIG. 6, a LED filament arrangement 600, in accordance with some embodiments, will be described. FIG. 6*a* is an isometric view of the LED filament arrangement 600. FIG. 6*b* is a cross-sectional view taken along the line C-C', similar to the cross-sectional views of FIGS. 3*b*, 4*b* and 5.

The LED filament arrangement 600 comprises a bending unit 620, which may be equivalent to bending units 120 or 220 described above with reference to FIGS. 1 and 2. The LED filament arrangement 600 further comprises a LED filament 610.

The LED filament 610 comprises a flexible carrier 611 on which a plurality of LEDs 612 is arranged. The LEDs 612 are arranged in a single row on a first surface 613 of the carrier 611. Especially, the LEDs 612 are arranged along a direction of elongation (i.e. along the elongation) of the LED filament. An encapsulant 614 covers (encapsulates) the carrier 611 and the LEDs 612. Specifically, both the first surface 613 and a surface opposite to the first surface of the carrier 611 are covered by the encapsulant 614, giving the LED filament 610 a round shape (i.e. a round cross section as shown in FIG. 6*b*). The carrier 611 may be at least partially light-transmissive, such as translucent or transparent.

The LEDs 612 are configured to emit light, which may be referred to as LED light. They may, for example, be configured to emit blue light (blue LEDs) or ultraviolet light (UV LEDs). Alternatively, red-green-blue (RGB) LEDs, which combine red, green and blue light to emit combined light, may be used. Especially in embodiments employing blue or UV LEDs, the encapsulant 614 may comprise a wavelength converting (luminescent) material. Such material may absorb light in a certain range of wavelengths and re-emit the light at a second, different, range of wavelengths, which may be referred to as converted light. The process of absorbing and re-emitting light at a different wavelength may be referred to as converting the wavelength of the light. Light emitted by a LED filament may be referred to as LED filament light. The LED filament light may comprise LED light and/or converted light.

A portion of the LED filament 610 is arranged within the channel of the bending unit 620. The portion of the LED filament 610 which is covered by (i.e. arranged within) the bending unit 620 comprises four LEDs, in the present embodiment. This is however only an example and the bending unit may surround more or less than four LEDs.

Although FIG. 6*a* shows ten LEDs 612 arranged in a single row on the carrier 611, in other embodiments, the LED filament may comprise fewer or more LEDs, which may be arranged in one or more rows, or in other configurations, on one or more sides of the carrier.

It will be appreciated that, in general, a LED filament may provide LED filament light and comprise a plurality of light emitting diodes (LEDs) arranged in a linear array. Preferably, the LED filament may have a length L and a width W, wherein L>5 W. The LED filament may be arranged in a straight configuration or in a non-straight configuration such as for example a curved configuration, a 2D/3D spiral or a helix. Preferably, the LEDs are arranged on an elongated carrier like for instance a substrate, that may be flexible (e.g. made of a polymer or metal e.g. a film or foil). The bending units described in the present disclosure may aid in arranging the LED filament in such configurations, by inducing bends in the LED filament.

In case the carrier comprises a first major surface and an opposite second major surface, the LEDs may be arranged on at least one of these surfaces. The carrier may be reflective or light-transmissive, such as translucent and preferably transparent.

The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods.

The LED filament may comprise multiple sub-filaments.

Figure 7:
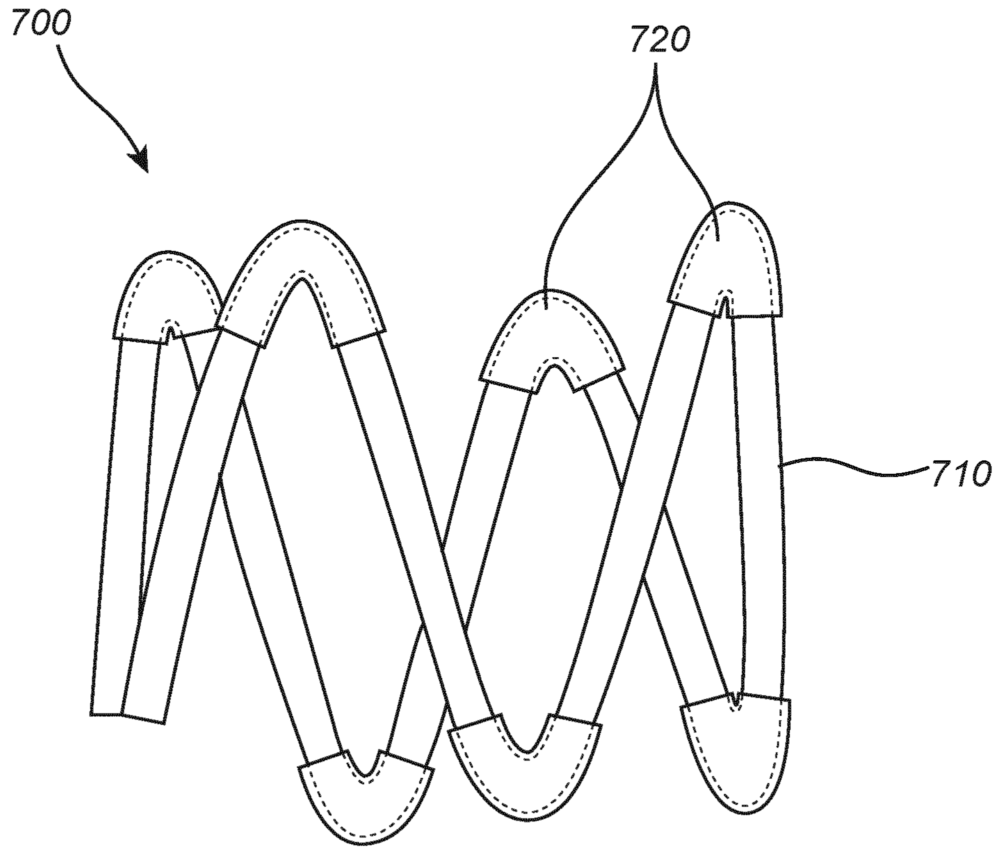
FIG. 7 is a schematic view of a LED filament arrangement, in accordance with some embodiments.

With reference to FIG. 7 a LED filament arrangement 700, in accordance with some embodiments, will be described. The LED filament arrangement 700 comprises a LED filament 710 which may be equivalent to the LED filament 610 described with reference to FIG. 6. The LED filament arrangement 700 further comprises a plurality of bending units 720. More specifically the LED filament arrangement 700 comprises seven bending units 720. The bending units 720 may be equivalent to any bending units described above with reference to FIGS. 1-6.

In the present embodiment, the portions of the LED filament 710 which are not covered by (i.e. arranged within the channels of) the bending units 720 are of similar length, and with little or no curvature (i.e. substantially straight). Further, the bending units 720 are arranged with alternating orientation, such that the LED filament 710 forms a zig-zag shape. Moreover, the two end points of the LED filament 710 are arranged next to each other, such that the zig-zag shaped arrangement 700 forms a crown-like shape. Such arrangements, in which the bends have a sharper corner appearance, may be created with the use of bending units with improved reliability over similar arrangements without bending units.

Figure 8:
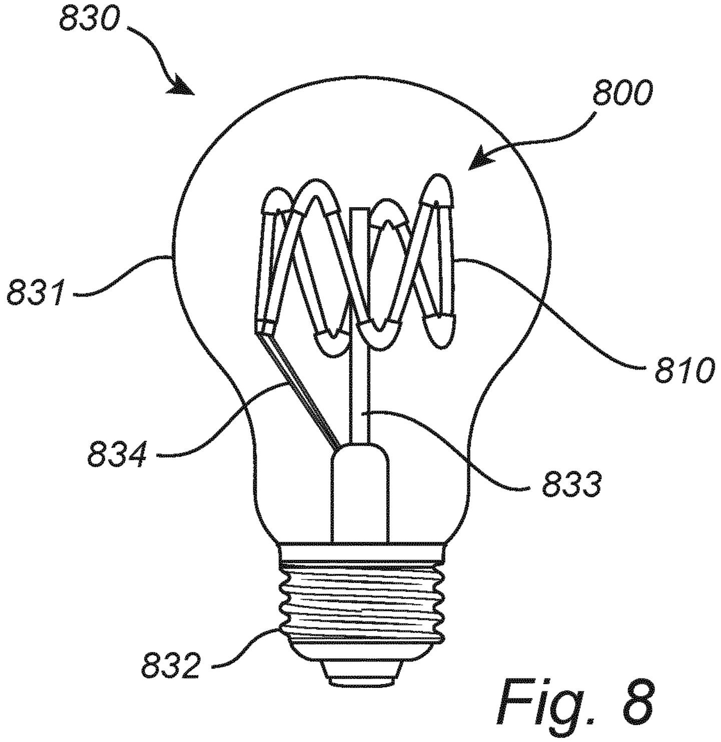
FIG. 8 is an illustration of a lighting device, in accordance with some embodiments.

With reference to FIG. 8, a lighting device 830, in accordance with some embodiments, will be described.

The lighting device 830 comprises a LED filament arrangement 800. In the present embodiment, the LED filament arrangement 800 may be equivalent to the LED filament arrangement 700 described with reference to FIG. 7. However, LED filament arrangements of other shapes, such as shown in the other embodiments, may also be used.

The lighting device 830 further comprises an at least partially light-transmissive envelope 831 which envelops the LED filament arrangement 800. Specifically, the envelope 831 is transparent. The envelope 831 is mounted on a base 832. The base 832 is adapted to be connected with a socket of a luminaire. The illustrated embodiment is adapted to be connected with a socket of Edison type. However, other embodiments may be adapted to other types of socket.

In order to arrange the LED filament arrangement 800 within the envelope 831 (or bulb), the arrangement 800 is connected with holding means 833, which also connect to the base 832. Further, electrical contacts 834 are provided for connecting the endpoints of the LED filament 810 with the base 832 in order to provide power to the LED filament 810.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without other features and elements or in various combinations with or without other features and elements.

Additionally, variations to the disclosed embodiments can be understood and effected by the skilled person in practicing the claimed invention, from a study of the drawings, the disclosure and the appended claims. In the claims, the word “comprising” does not exclude other elements, and the indefinite article “a” or “an” does not exclude a plurality. The mere fact that certain features are recited in mutually different dependent claims does not indicate that a combination of these features cannot be used to advantage.

The invention claimed is:

1. A light emitting diode, LED, filament arrangement, comprising:

an elongated, flexible LED filament having a plurality of LEDs arranged along the elongation of the LED filament; and at least one bending unit having a body in which a channel is formed, said channel being at least partially curved;

wherein for each said bending unit, a portion of said LED filament is arranged within said channel of said bending unit, said bending unit being adapted to induce only a single bend in said LED filament, and to hold the LED filament in its bent form, and wherein the length of the bending unit is 0.05 to 0.3 times the length of the LED filament.

2. The LED filament arrangement of claim 1, wherein the length of the bending unit is 0.08 to 0.25 times the length of the LED filament, or more preferably 0.1 to 0.2 times the length of the LED filament.

3. The LED filament arrangement according to claim 1, wherein said bending unit is at least partially light transmissive.

4. The LED filament arrangement according to claim 1, wherein said bending unit is at least partially light blocking.

5. The LED filament arrangement of claim 1, wherein said bending unit comprises a material with a thermal conductivity of at least 200 $Wm^{-1}K^{-1}$.

6. The LED filament arrangement of claim 1, wherein at least one of said bending units comprises a slit for insertion of the LED filament into the channel, said slit extending along an elongation of the channel.

7. A light emitting diode, LED, filament arrangement, comprising:

an elongated, flexible LED filament having a plurality of LEDs arranged along the elongation of the LED filament; and a bending unit having a body in which a channel is formed, said channel being at least partially curved;

wherein a portion of said LED filament is arranged within said channel of said bending unit, said bending unit being adapted to induce a bend in said LED filament, and to hold the LED filament in its bent form, wherein the length of the bending unit is 0.05 to 0.3 times the length of the LED filament, and, wherein a surface of the body defining a wall of the channel comprises at least one recess.

8. The LED filament arrangement of claim 7, wherein said recess extends along an extension of said channel.

9. The LED filament arrangement of claim 1, wherein a surface of the body defining a wall of the channel has a reflectivity of at least 85%.

10. The LED filament arrangement of claim 1, wherein a surface of the body defining a wall of the channel is covered with a coating layer comprising a metal, or a polymer and light scattering particles.

11. The LED filament arrangement of claim 1, wherein said portion of the LED filament being arranged within the channel of the bending unit comprises more than one LED.

12. The LED filament arrangement of claim 1, further comprising a plurality of bending units, wherein each bending unit is adapted to induce a bend in said LED filament.

13. The LED filament arrangement of claim 1, wherein the at least partial curvature of the channel is rounded such that said channel has a U-shape.

14. The LED filament arrangement of claim 1, wherein each said bending unit has a tubular shape.

15. A lighting device comprising:

a LED filament arrangement as defined in claim 1;

an at least partially light transmissive envelope at least partly enveloping said LED filament arrangement; and a base on which said envelope is mounted, wherein said base is adapted to be connected to a luminaire socket.

16. The LED filament arrangement of claim 1, wherein further portions of the LED filament are not arranged within a bending unit.

* * * * *